Patented May 28, 1940

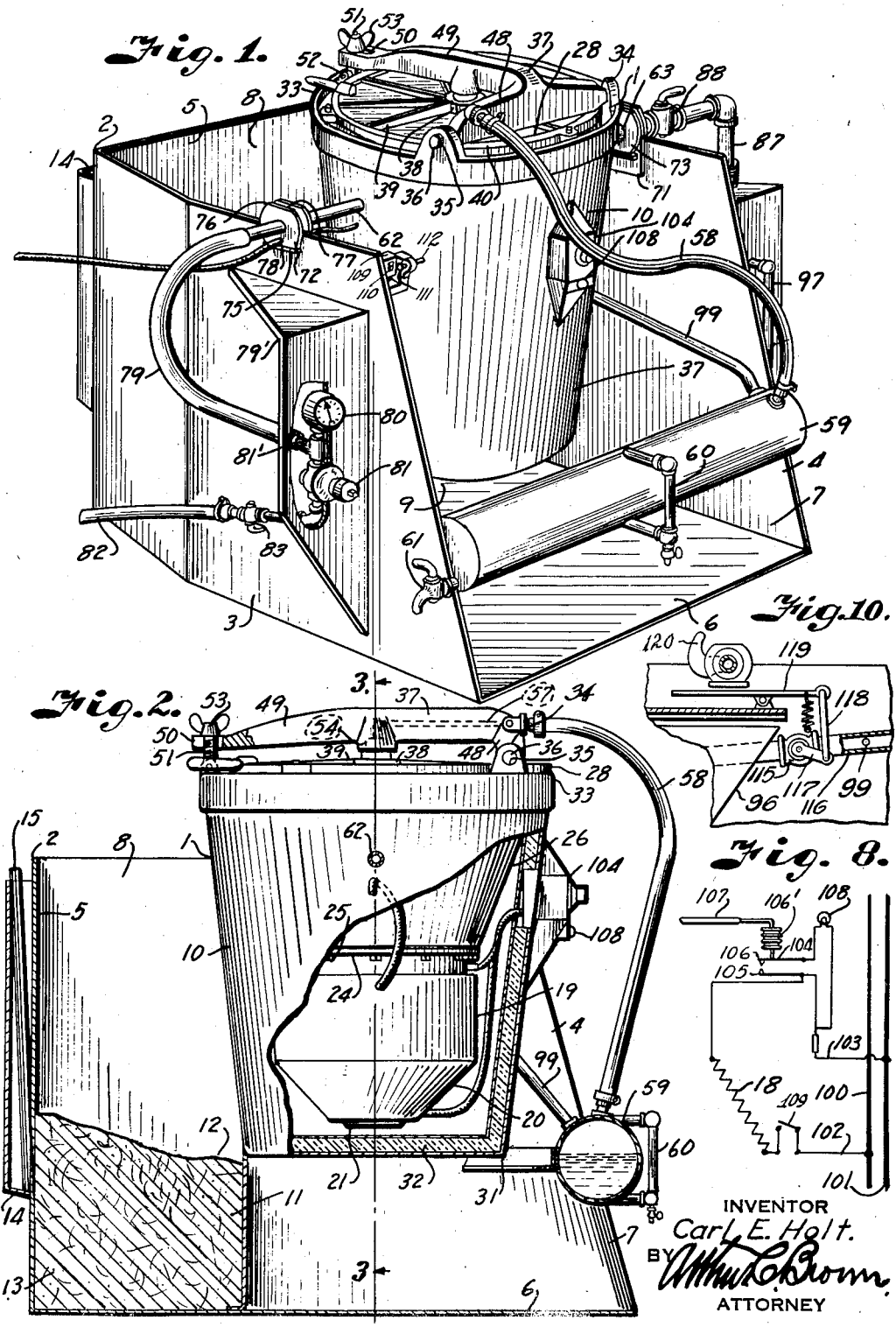

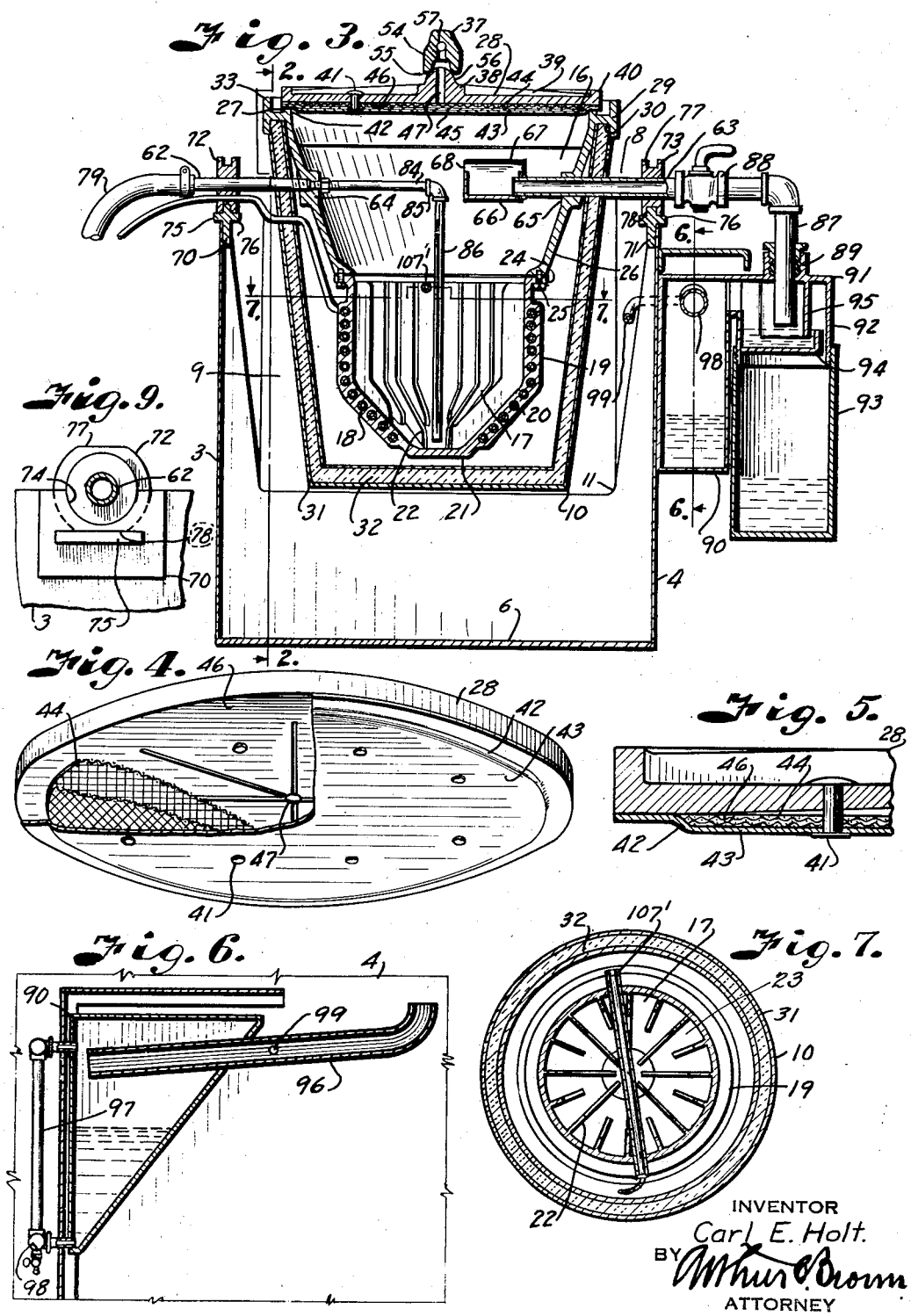

2,202,657

UNITED STATES PATENT OFFICE 2,202,657

APPARATUS FOR REFINING USED LUBRICATING OIL

Carl E. Holt, Kansas City, Mo.

Application August 16, 1937, Serial No. 159,287

13 Claims. (Cl. 196—16)

This invention relates to a method of and apparatus for refining used lubricating oil, and has for its principal object to provide for the rapid purification of small, individual quantities of oil, for example, the quantity of oil drained from the crank case of a motor vehicle, so that the same oil may be returned to the crank case without intermixture with other grades and kinds of oil during purification.

Other important objects of the invention are to heat the oil while confined in a small but relatively deep pool and subject it to violent agitation by the introduction of a dry gaseous medium, permanent at atmospheric temperatures, such as air; to provide a relatively wide, wet area over the top of the oil for fractionating the vapors issuing from the oil; to provide for filtering the oil while contained in a shallow, quiet pool of large area for permitting rapid filtration and cooling; to effect circulation of the oil in moving contact with heated surfaces incidental to introduction of the gas; to utilize the pressure of the dry gas for forcibly discharging the oil through the filtering medium; to aerate the oil; and to free the oil of objectionable odors.

Other important objects of the invention are to provide for removal of the light products of distillation without undue back pressure in the refining vessel; and to provide means for collecting the filtered oil for further cooling and aeration.

In accomplishing these and other objects of the invention, as hereinafter pointed out, I have provided improved details of structure, the preferred form of which is illustrated in the accompanying drawings, wherein:

Fig. 1 is a perspective view of an oil purifying apparatus embodying the features of the present invention.

Fig. 2 is a longitudinal section on the line 2—2 of Fig. 3, and showing the insulating jacket of the refining vessel broken away to better illustrate the construction.

Fig. 3 is a vertical section on the line 3—3 of Fig. 2.

Fig. 4 is a detail perspective view of the filtering head and cover of the vessel.

Fig. 5 is a detail fragmentary section through the rim of the cover.

Fig. 6 is a detail section through the condensate collecting chamber for recovering the light fractions, taken on the line 6—6 of Fig. 3.

Fig. 7 is a horizontal section through the refining vessel on the line 7—7 of Fig. 3.

Fig. 8 is a diagrammatic view of the electrical system.

Fig. 9 is a section through one of the journals mounting the refining vessel.

Fig. 10 is a detail section of a modified arrangement of vent control valve whereby the vent is automatically controlled responsive to tipping of the refining vessel.

Referring more in detail to the drawings:

1 designates an oil purifying apparatus constructed in accordance with the present invention, and which includes a supporting frame 2 formed of sheet metal and having side walls 3—4, a rear wall 5, a bottom 6, and an open front and top 7 and 8 respectively, to form a compartment 9 within which is journally suspended a refining vessel 10. Extending across the lower portion of the compartment, and terminating short of the bottom of the vessel 10, is a partition 11, cooperating with the rear and side walls to form a storage bin 12 for containing a filtering media 13, such as fuller's earth, to be used in the refining process as later described. Supported on the rear wall 5 is a pocket 14 for storing sheets of filtering paper or the like 15 to be used in the apparatus for removing the filtering media when the oil is drained from the vessel.

The refining vessel 10 includes upper and lower sections 16 and 17 of differential diameters and shape. The lower section 17 constitutes the heating compartment of the vessel and is of relatively narrow diameter but of sufficient depth to contain the volume of oil removed from the crank case of a motor vehicle. The section 17 is formed of metal having high conductivity and is relatively thick in order to retain the heat generated by electrical resistance elements or coils 18 that are imbedded within the wall thereof, as shown in Fig. 3. The upper portion 19 of the lower section 17 is of substantially cylindrical form but the lower portion 20 flares inwardly toward the axis thereof to terminate in a relatively small, flat bottom portion 21 for diverting the agitating medium that is admitted to the vessel, as later described. The interior of the lower section also has a series of radial flanges or heat conducting fins 22 forming channels 23 therebetween, through which the oil is caused to circulate. These fins materially increase the heated contact surfaces with the oil to reduce the heating time. The fins, supplemented by the thickness and high conductivity of the vessel wall, diffuse the heat to prevent localized hot spots in the wall of the vessel that might cause an explosion. The wall of the vessel is thus uniformly heated over its entire area and the temperature is maintained below the point where explosions are apt to occur. The extent of heating surface, due to the fins, is greater than the normal contact surface of the vessel wall, consequently the required intensity of the heating elements is materially less than would be required without the fins.

The rim of the section 17 is provided with a laterally extending annular flange 24 to connect with the bottom of the upper section 16 by fastening devices, such as cap screws 25, extending through suitable openings in the flanges and through threaded sockets of the upper section. The upper section 16 has its side wall 26 flaring outwardly from the cylindrical portion of the lower section to provide a relatively large open end having an annular seat 27 for mounting a cover element 28. The rim of the vessel carries a laterally extending annular flange 29, having a downwardly facing groove 30 to seat the rim of a heat insulating jacket 31. The heat insulating jacket 31 includes spaced inner and outer walls enclosing an insulating material 32. The wall of the jacket converges downwardly following the general outline of the refining vessel, and terminates in a flat bottom formed in the same manner as the side wall. The flange 29 also has an upwardly projecting annular rib 33, spaced from the seat 27 as shown in Figs. 1 and 3.

Extending upwardly from the rib 33, on opposite sides of the vessel and offset from the diameter thereof, are ears 34 having openings 35 for pivotally mounting the trunnions 36 of a cover clamping member 37. The cover 28 includes a flat, plate-like disk, of suitable diameter to extend over the seat 27, and carries a central boss 38 and radial reinforcing ribs 39, terminating in an annular reinforcing flange 40 at the peripheral edge of the cover. Fixed to the inner grooved face of the cover by suitable fastening devices, such as rivets 41, is a filter pad 42 comprising an outer layer of felt paper or the like 43 and a plurality of inner layers of wire screen 44, the felt paper overlying the periphery of the layers of screen to cooperate with the seat 27 in clampingly retaining a sheet of filtering paper 45. The layers of screen are to space the felt paper away from the lower face 46 of the cover to provide suitable channels through which the oil is drained toward a central outlet 47 in the boss 38.

The clamping lever 37 includes a head 48 carrying the trunnions 36 and a central clamping lever 49 extending over the boss and terminating in a slotted end 50 to be engaged by a clamping stud 51 that is hinged to ears 52 projecting from the flange 40. The clamping stud 51 carries a wing nut 53 that is threaded against the slotted end of the lever 49 to effect clamping of the cover against its seat on the rim of the vessel.

The lever 49 includes a socket 54, having a seat 55 for sealingly engaging a rounded surface 56 on the boss 38. The clamping lever, including the head 48, is provided with channels 57 connecting the outlet 47 with a hose connection 58 leading to a collecting tank 59. The tank 59 is of cylindrical form and is horizontally supported between the side walls 3 and 4 in the open front 7 at a point below the vessel when the vessel is inverted as later described. The tank 59 is provided with a gauge glass 60 through which the levels and contents in the tank may be inspected. The tank is also provided adjacent one end thereof with a draw-off valve 61 whereby the refined oil may be removed for replacement in the crank case of the motor vehicle.

The refining vessel just described is rotatably supported upon tubular shafts 62 and 63 carried in bosses 64 and 65 arranged on diametrically opposite sides of the upper section of the vessel as best shown in Fig. 3, the end of the shaft 62 being threaded in the boss 64 while the end of the shaft 63 projects through the boss 65 into the interior of the vessel to carry a gas collecting head 66. The head 66 is of box-like shape and has a covered top 67 open at the ends, as at 68, to permit entrance of gas therein for discharge through the tubular shaft 63. The shafts 62 and 63 project through suitable openings in the jacket and carry flanged bearing members 70 and 71 carried in bearings 72 and 73 mounted on the upper edge of the side walls 3 and 4 as best shown in Figs. 1, 3 and 9. The bearing members 70 and 71 have notches 74 for receiving the flanged bearings 72 and 73 and have radially extending flanges 75 and 76 adapted to respectively engage flat sides 77 and 78 on the flanges of the members 72 and 73 to support the vessel in its two positions, that is, in the position shown in Fig. 1, or in an inverted position as when the oil is being filtered and discharged into the tank 59. The shaft 62 projects through its bearing member and is connected by a flexible conduit 79 with a pressure medium supply fitting that is carried on a bracket-like wing 79' projecting from the outer face of the wall 3. The flexible connection 79 is of sufficient length to allow for inverting of the refining vessel as later described. The fitting carries a suitable pressure gauge 80 and a pressure regulating valve 81 having connection with a flexible conduit 82 leading to a suitable source of pressure medium supply, such as compressed air, the flow of which is controlled by a shut-off valve 83. The fitting also carries an orifice member 81' having a relatively small opening adapted to pass the air at a predetermined rate and which facilitates adjusting of the regulator 81.

Connected with the shaft 62 is a pipe 84 extending in the vessel to the axis thereof and carrying an elbow 85 to which is connected an axial pipe 86 leading to the bottom of the heating chamber and terminating short of the bottom 21. The shaft 63 projects through the bearing member 71 and is rotatably connected with an L that carries a depending pipe 87 which is movable in a stuffing box 89 carried by a tank 90 supported on the outer face of the side wall 4, the flow from the vessel through the shaft being controlled by a valve 88. The tank 90 is of substantially triangular shape, as shown in Fig. 6, and has a lateral extension 91 carrying the packing gland 89 and having a depending neck 92 for connecting a collecting chamber 93. Supported within the neck 92 is a tray 94 for containing a body of liquid in sealing relation with a baffle 95 depending from the top wall of the tank so as to provide a sealed passageway from the tank to the receptacle 93 for diverting flow of gas from the pipe 87 into the tank 90 where the heavy gases condense and the lighter gases are discharged through a pipe 96 to atmosphere.

The tank 90 is provided with a gauge glass 97 and a draw-off valve 98 through which the condensate may be removed from the tank. The tank 59 is connected with the vent pipe 96 through a duct 99 connecting the upper portion of the tank 59 with the vent pipe.

The resistance coils are supplied with current from service lines 100 and 101 through conductors 102 and 103 (Fig. 8). Inserted in the conductor 103 is a thermostatically operated switch 104 including a fixed contact 105 and a movable contact 106 operated by pressure set up in a bellows 106' connected with a bulb 107 filled with a heat responsive fluid which, upon heating, expands to effect movement of the contact 106 away from the contact 105. The bulb is contained in a tube 107' that projects into the refining vessel at a point below the normal level of liquid therein, as shown in Fig. 3. Connected across the contacts 105 and 106 is a signal light 108 through which the current is by-passed when the contacts are broken showing that the desired temperature has been reached in the refining vessel and indicating that the oil is ready to be removed therefrom.

If desired the switch 109 may be inserted in the conductor 102 to break the circuit to the heating element. The switch 109 is carried by the side wall 3 and has an arm 110 that is adapted to be engaged by the head 111 of a plunger 112, the plunger 112 being supported in the path of travel of the vessel when it is moved to filtering position. With this arrangement circuit is automatically broken to the heating element whenever the vessel is tipped to inverted position.

In operating an apparatus constructed and assembled as described, the refining vessel is moved to the position shown in Fig. 1 to permit removal of the cover and insertion of the oil to be retained which collects within the heat chamber that is provided in the lower section of the vessel. A quantity of filter material 12 is then poured into the oil after which a sheet of filtering paper 15 is placed over the top of the vessel so that the margin thereof engages the seat 27. The cover is then placed over the filtering paper and secured by the clamping lever 37, which is lowered over the cover so that the socket 54 thereon engages the spherical surface of the boss 38. The lever is then clamped to the vessel by tightening the wing nut 53 to effect a vapor-tight seal about the periphery of the cover. The valve 83 is opened to admit the agitating medium to the vessel. The pressure regulator is then adjusted to supply the agitating medium at the desired pressure. The agitating medium flows through the flexible connection 79, tubular shaft 62 and pipes 84 and 86 to the bottom of the heat chamber where it is deflected upwardly through the body of oil, causing violent agitation thereof and mixture with the filtering material. Current is established to the resistance coils to heat the oil while it is being agitated by the agitating medium. The agitating medium causes the heated oil to move upwardly in contact with the inner surface of the vessel and in heat exchange contact with the fins to fall back toward the center for return over the heating surfaces.

The oil thus circulates so as to continually bring portions thereof into direct contact with the heating surfaces, so that the oil is rapidly brought to the desired temperature for effecting distillation of the gasoline, water, and other dilutents contained therein. The vapors are driven by the air to the top of the vessel as rapidly as they are generated to contact the oil wetted surface of the filtering paper for fractionation of the oil vapors. The gas and water vapors, including the air, flow through the openings in the head 66, and out through the tubular shaft 63, through the valve 88, L and pipe 87, into the tank 90. The tank 90, being located exteriorly of the vessel, is carried at a suitable temperature to effect condensation of the readily condensable vapors in the form of penetrating oil which collects in the bottom of the tank and which may be drawn therefrom at suitable periods upon opening of the valve 98. The air, water vapors and odors pass out through the vent pipe 96 to atmosphere. Any liquids carried over with the gas collect in the pan 94 to effect a liquid seal relatively to the container 93. Surplus liquid collecting in the pan will overflow the wall thereof and collect in the bottom of the receiver, from where it may be readily removed by unscrewing the receiver from the neck 92. The extremely fine particles and carbonaceous matter collect upon the particles of filtering material which are kept in constant movement so as to assure thorough contact of all the particles. Movement of the oil through the passageways between the fins permits raising of the oil temperature in a very short period of time with a minimum amount of current consumption.

When the temperature in the vessel has reached a point where it will operate the thermostatic switch, current to the heater is shut off whereupon the current will then flow through the signal light, indicating that the oil is ready to be filtered. The valve 88 is now closed and the vessel is swung on its bearings so that the cover end thereof is lowermost. The vessel will be supported in this position since the flat sides 77 of the bearing members are brought into contact with the flanges of the bearing supports 70 and 71. The oil then flows from the heating chamber to collect in a relatively shallow, flat pool over the extended area of the filter paper. The pressure medium is then discharged from the pipe 86 to act on the surface of the oil, forcing it through the filtering paper and into the channels of the cover where it drains through the hose connection 58 into the collecting tank 59. Since the valve 88 has been closed the pressure of the agitating medium rises sufficiently to force the oil rapidly through the filtering medium into the collecting pan. This rise in pressure is indicated on the pressure gauge 80. When the gauge 80 indicates return to approximately normal pressure, all of the oil has been discharged and the filtering material is collected in a cake on the top of the filtering paper. The valve 88 is opened to permit scavenging of vapors remaining in the refining vessel. The purified oil is then removed from the tank 59 by opening the valve 61. The valve 83 is then closed, after which the cover is removed, including the filtering paper carrying the spent filtering medium. The vessel is then rotated to its normal position, after which a new supply of oil may be inserted and refined as above described.

Fig. 10 shows a valve 115 located in the vent pipe 116 which is analogous to the vent pipe 96 above described. The valve includes an arm 117 that is connected by a link 118 with a rock lever 119, the rock lever 119 being supported in the path of a cam-like plate 120 fixed to the side of the refining vessel so that when the refining vessel or reservoir is oscillated about its axis the valve 115 is closed to prevent escape of pressure medium in a manner similar to the functioning of the valve 88, the valve being normally retained in open position by a spring or the like 121.

What I claim and desire to secure by Letters Patent is:

1. In an apparatus of the character described, a vessel having a cylindrical heating section provided with a substantially cone-shaped bottom, and an upper section interconnected with the heating section and having an outwardly flaring wall terminating in an annular seat, a sheet of filtering material having its periphery supported on said seat, a cover closing the vessel and cooperating with said seat to sealingly retain the sheet of filtering material, a collecting tank, oil conducting means connecting the cover with the collecting tank, pressure supply means for discharging an agitating medium into the cone-shaped bottom of the heating section, and means movably supporting the vessel to effect movement of the oil from the heating section for collection in a relatively shallow pool over the sheet of filtering material whereby said agitating medium is effective in promoting flow of oil through the sheet of filtering material into the collecting tank.

2. In an apparatus of the character described, a vessel having a cylindrical heating section provided with a substantially cone-shaped bottom, fins extending inwardly from the wall of the heating section to increase the heating surface in contact with the oil contained in said section, and an upper section interconnected with the heating section and having an outwardly flaring wall terminating in an annular seat, a sheet of filtering material having its periphery supported on said seat, a cover closing the vessel and cooperating with said seat to sealingly retain the sheet of filtering material, a collecting tank, conducting means connecting the cover with the collecting tank, means for discharging an agitating medium into the cone-shaped bottom of the heating section, and means movably supporting the vessel to effect movement of the oil from the heating section for collection in a relatively shallow pool over the sheet of filtering material for flow into the collecting tank.

3. Apparatus for refining used lubricating oil comprising a reservoir, a frame pivotally supporting the reservoir, means for heating the oil being refined in the reservoir when the same is in one position, an outlet port formed through one wall of the reservoir to permit the flow of oil from the reservoir when the same is oscillated to another position, a conduit for introducing a supply of air under pressure extending into the reservoir and terminating at the bottom thereof when the reservoir is in the position to heat the oil being refined, and a pipe for drawing off evolved gases and vapors extending into the reservoir and terminating at the top of the reservoir when the same is in the position to heat the oil, the said air conduit being movable with the said reservoir as it is oscillated about its pivotal axis, said pipe being stationary with respect to said reservoir.

4. Apparatus for refining used lubricating oil comprising a reservoir, a frame pivotally supporting the reservoir, means for heating the oil being refined in the reservoir when same is in one position, an outlet port formed through one wall of the reservoir to permit the flow of oil from the reservoir when the same is oscillated to another position, a conduit for introducing a supply of air under pressure extending into the reservoir and terminating at the bottom thereof when the reservoir is in the position to heat the oil being refined, and a pipe for drawing off evolved gases and vapors extending into the reservoir and terminating at the top of the reservoir when same is in the position to heat the oil, the said air conduit being movable with said reservoir as it is oscillated about its pivotal axis, said pipe being stationary with respect to said reservoir, said conduit and said pipe being extended into said reservoir along the pivotal axis of the same.

5. Apparatus for refining used lubricating oil comprising a reservoir, a frame pivotally supporting the reservoir, means for heating the oil being refined in the reservoir when the same is in one position, a removable cover for the reservoir having an outlet port formed therethrough, a pipe for drawing off evolved gases and vapors extending into the reservoir, a condenser chamber exteriorly of the reservoir in connection with the said pipe having an escape vent formed through one wall thereof, and means operable by the oscillation of the reservoir about its axis for opening and closing said escape vent.

6. Apparatus of the character described comprising a tiltable reservoir having an outlet formed through the top wall thereof, means for heating the reservoir, a filtering member within the reservoir extending across the said outlet, means for introducing air into the reservoir at the bottom thereof to act as agitating means for the material being treated, means for removing gas and air from the reservoir at the top thereof, and means to shut off said gas and air removing means when the reservoir is tilted to permit the flow of material through said outlet whereby air entering said reservoir through the said introducing means serves to build up a pressure to force the material through the filtering member and outlet.

7. In apparatus of the character described, a reservoir, a frame supporting said reservoir for pivotal movement about a horizontal axis, means for heating the oil being refined in the reservoir, a take off pipe for evolved gases and vapors extending into said reservoir, and a condenser chamber in connection with the take-off pipe, said chamber being supported by and housed within the said supporting frame.

8. In an oil refining apparatus of the character described, a reservoir, a frame supporting said reservoir for pivotal movement about a horizontal axis, means for heating the oil being refined in the reservoir, a cut-off for the heating means, and structure operable by the swinging of the reservoir about its axis from an upright to an inverted position for operating the cut-off.

9. In an apparatus of the character described, an oil refining receptacle having a heating section and an interconnected oppositely arranged filtering section, means connected with the receptacle for admitting oil to be refined, a support, means movably mounting the receptacle on the support whereby the receptacle is moved to a position so that the oil is confined in the heating section and to another position where the oil flows from the heating section to the filtering section, and a filter covering the cross-sectional area of the filtering section and arranged in the path of the oil when the receptacle is moved to said last named position for filtering the oil.

10. In an apparatus of the character described, an oil refining receptacle having a heating section and an interconnected oppositely arranged filtering section, means for admitting oil and a filtering medium to the receptacle, a support, means movably mounting the receptacle on the support whereby the oil is confined in the heating section in one position of the receptacle and transferred into the filtering section in another position of the receptacle, a filter covering the cross-sectional area of the filtering section, and pressure supply means connected with the receptacle for forcing the oil through said filter when the oil is contained in the filtering section.

11. In an apparatus of the character described, an oil refining receptacle having a heating section and an interconnected oppositely arranged filtering section, means for admitting oil and a filtering medium to the receptacle, a support, means movably mounting the receptacle on the support for movement about a horizontal axis between said sections whereby the oil is confined in the heating section in one position of the receptacle and moved into the filtering section incidental to inverting the receptacle, air supply means connected with the receptacle and having outlet into the body of oil when contained in the heating section to effect agitation of said oil, a filter covering the cross-sectional area of the filtering section, a vapor discharge line connected with the receptacle at a point between the respective liquid levels in said sections, and a valve in said line to close said line for forcing the oil through said filter when the oil is contained in the filtering section.

12. In an apparatus of the character described, an oil refining vessel having a heating section and an interconnected oppositely arranged filtering section of substantially larger cross-sectional area than the heating section, means movably supporting the vessel for rotation about a horizontal axis whereby a body of oil under treatment is transferred from the heating section to the filtering section incidental to inverting the vessel, a filter covering the cross-sectional area of the filtering section, pressure supply means connected with the vessel and having outlet into the body of oil when contained in the heating section for admitting an agitating medium to effect agitation of the oil and mixture of a filtering medium with the oil, a vapor outlet duct connected with the vessel at a point above the level of oil when it is contained in the heating section, and a valve in said vapor outlet duct for closing said vapor outlet for rendering said agitating medium effective to force the oil through said filter when the vessel is rotated about said axis to move the oil into the filtering section.

13. In an apparatus of the character described, an oil refining receptacle having a heating section in one end and an interconnected filtering section in the opposite end of substantially larger diameter than the heating section, means supporting said receptacle on a horizontal axis whereby the receptacle is moved from a position wherein the oil is contained in the heating section to an inverted position where the oil is moved into the filtering section, a filter extending across the interior of the filtering section, an oil collecting vessel having connection with the filtering section on the side of the filter opposite said heating section for collecting the oil after being passed through the filter, and conduit means connected with said vessel for removing vapors therefrom.

CARL E. HOLT.